United States Patent
Templ et al.

(10) Patent No.: US 8,611,754 B2
(45) Date of Patent: Dec. 17, 2013

(54) METHOD FOR DATA TRANSMISSION USING AN ENVELOPE ELIMINATION AND RESTORATION AMPLIFIER, AN ENVELOPE ELIMINATION AND RESTORATION AMPLIFIER, A TRANSMITTING DEVICE, A RECEIVING DEVICE, AND A COMMUNICATION NETWORK THEREFOR

(75) Inventors: Wolfgang Templ, Sersheim (DE); Dirk Wiegner, Schwaikheim (DE)

(73) Assignee: Alcatel Lucent, Paris (FR)

( * ) Notice: Subject to any disclaimer, the term of this patent is extended or adjusted under 35 U.S.C. 154(b) by 152 days.

(21) Appl. No.: 13/258,650

(22) PCT Filed: Mar. 16, 2010

(86) PCT No.: PCT/EP2010/053365
§ 371 (c)(1),
(2), (4) Date: Sep. 22, 2011

(87) PCT Pub. No.: WO2010/108818
PCT Pub. Date: Sep. 30, 2010

(65) Prior Publication Data
US 2012/0014694 A1 Jan. 19, 2012

(30) Foreign Application Priority Data
Mar. 24, 2009 (EP) .................................... 09305258

(51) Int. Cl.
*H04B 10/00* (2013.01)
(52) U.S. Cl.
USPC ............................. 398/116; 398/115; 398/141
(58) Field of Classification Search
USPC .......................... 398/115–117, 141
See application file for complete search history.

(56) References Cited

U.S. PATENT DOCUMENTS

| 4,831,334 | A | * | 5/1989 | Hudspeth et al. | 330/10 |
| 5,247,310 | A | * | 9/1993 | Waters | 342/368 |
| 5,249,201 | A | * | 9/1993 | Posner et al. | 375/295 |
| 5,339,184 | A | * | 8/1994 | Tang | 398/116 |
| 5,598,288 | A | * | 1/1997 | Collar | 398/193 |
| 5,847,602 | A | * | 12/1998 | Su | 330/10 |

(Continued)

FOREIGN PATENT DOCUMENTS

| EP | 1 553 791 A | 7/2005 |
| JP | 2005 175675 A | 6/2005 |
| WO | WO 2004/112286 A | 12/2004 |

OTHER PUBLICATIONS

International Search Report for PCT/EP2010/053365 dted Apr. 8, 2010.

*Primary Examiner* — Agustin Bello
(74) *Attorney, Agent, or Firm* — Fay Sharpe, LLP

(57) ABSTRACT

The invention concerns a method for transmission of data signals from a transmitting device (BS) to a receiving device (RAH1) using an envelope elimination and restoration amplifier (EER1, EER2) for signal amplification, wherein the data signals are represented by envelope signal components and phase signal components in a first part of the envelope elimination and restoration amplifier (EER1, EER2) located in the transmitting device (BS), the envelope signal components or phase signal components are transmitted over at least one optical connection (OF1, OF2) from the transmitting device (BS) to the receiving device (RAH1), and the envelope signal components or phase signal components are converted from optical signals into electrical signals in said receiving device (RAH1), an envelope elimination and restoration amplifier, a transmitting device, a receiving device, and a communication network therefor.

20 Claims, 7 Drawing Sheets

(56) References Cited

U.S. PATENT DOCUMENTS

Figure 1:
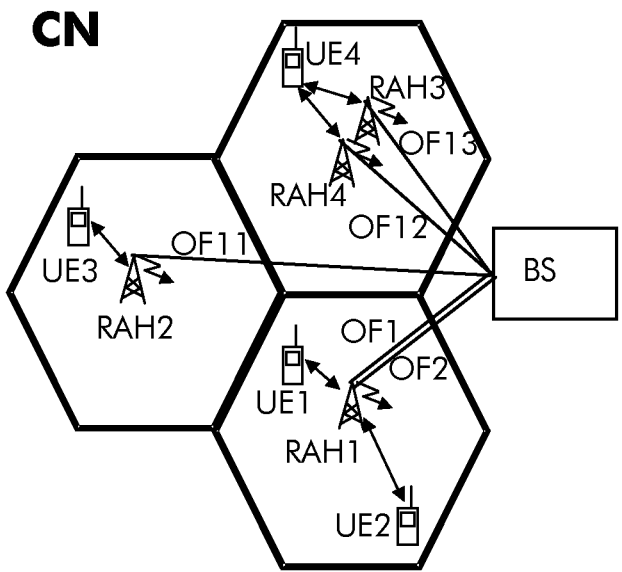

| | | | |
|---|---|---|---|
| 5,942,938 A * | 8/1999 | Myers et al. | 330/10 |
| 6,122,083 A * | 9/2000 | Ohta et al. | 398/1 |
| 6,130,910 A * | 10/2000 | Anderson et al. | 375/238 |
| 6,147,553 A * | 11/2000 | Kolanek | 330/10 |
| 6,256,482 B1 * | 7/2001 | Raab | 455/108 |
| 6,583,679 B1 * | 6/2003 | Cox et al. | 332/149 |
| 6,587,257 B1 * | 7/2003 | Davies | 359/328 |
| 6,728,277 B1 * | 4/2004 | Wilson | 372/38.1 |
| 6,748,177 B1 * | 6/2004 | Upton | 398/129 |
| 6,788,151 B2 * | 9/2004 | Shvarts et al. | 330/297 |
| 6,801,082 B2 * | 10/2004 | Midya et al. | 330/10 |
| 6,937,668 B2 * | 8/2005 | Sridharan et al. | 375/296 |
| 6,980,831 B2 * | 12/2005 | Matsuyoshi et al. | 455/561 |
| 7,013,090 B2 * | 3/2006 | Adachi et al. | 398/183 |
| 7,068,096 B2 * | 6/2006 | Chu | 330/10 |
| 7,116,946 B2 * | 10/2006 | Tanabe et al. | 455/91 |
| 7,245,888 B2 * | 7/2007 | Sointula | 455/127.1 |
| 7,254,186 B2 * | 8/2007 | Liu | 375/316 |
| 7,359,680 B2 * | 4/2008 | Klemmer | 455/102 |
| 7,379,715 B2 * | 5/2008 | Udagawa et al. | 455/126 |
| 7,395,038 B2 * | 7/2008 | McCune | 455/127.1 |
| 7,400,865 B2 * | 7/2008 | Jarvinen | 455/114.2 |
| 7,406,131 B2 * | 7/2008 | Rudolph | 375/295 |
| 7,509,102 B2 * | 3/2009 | Rofougaran et al. | 455/127.1 |
| 7,579,922 B2 * | 8/2009 | Jensen et al. | 332/128 |
| 7,664,202 B2 * | 2/2010 | Hara et al. | 375/297 |
| 7,773,693 B2 * | 8/2010 | Brobston | 375/298 |
| 7,852,149 B1 * | 12/2010 | Wagner | 330/10 |
| 7,898,327 B2 * | 3/2011 | Nentwig | 330/149 |
| 7,991,366 B2 * | 8/2011 | Lee | 455/108 |
| 8,064,540 B2 * | 11/2011 | Zhou et al. | 375/300 |
| 8,145,151 B2 * | 3/2012 | Nentwig | 455/115.1 |
| 8,260,144 B2 * | 9/2012 | Gupta et al. | 398/115 |
| 8,260,145 B2 * | 9/2012 | Gupta et al. | 398/115 |
| 8,346,189 B2 * | 1/2013 | Dupuy et al. | 455/114.1 |
| 8,385,468 B2 * | 2/2013 | Karthaus et al. | 375/300 |
| 8,411,788 B2 * | 4/2013 | Sahota | 375/295 |
| 2002/0141510 A1 * | 10/2002 | Sridharan et al. | 375/300 |
| 2005/0002469 A1 * | 1/2005 | Oberg et al. | 375/295 |
| 2006/0140644 A1 * | 6/2006 | Paolella | 398/189 |
| 2006/0240789 A1 * | 10/2006 | Rosnell et al. | 455/127.4 |
| 2008/0068240 A1 * | 3/2008 | Matsuura | 341/143 |
| 2009/0004981 A1 * | 1/2009 | Eliezer et al. | 455/127.1 |
| 2009/0267581 A1 * | 10/2009 | Nentwig | 323/282 |
| 2010/0060358 A1 * | 3/2010 | Nentwig | 330/199 |
| 2010/0091900 A1 * | 4/2010 | Gan | 375/267 |
| 2012/0014694 A1 * | 1/2012 | Templ et al. | 398/43 |
| 2012/0039320 A1 * | 2/2012 | Lemson et al. | 370/338 |

\* cited by examiner

METHOD FOR DATA TRANSMISSION USING AN ENVELOPE ELIMINATION AND RESTORATION AMPLIFIER, AN ENVELOPE ELIMINATION AND RESTORATION AMPLIFIER, A TRANSMITTING DEVICE, A RECEIVING DEVICE, AND A COMMUNICATION NETWORK THEREFOR

The invention relates to a method for transmission of data signals according to the preamble of claim 1, an envelope elimination and restoration amplifier according to the preamble of claim 8, a transmitting device according to the preamble of claim 10, a receiving device according to the preamble of claim 13, and a communication network according to the preamble of claim 15.

The coverage of a certain service area in a cellular radio network is provided by several radio base stations, which are connected to a core network to serve connections to and from mobile users within the service area. A radio base station contains a baseband unit and at least one antenna unit. In order to increase radio coverage and capacity, modern base stations use several sector antennas.

In order to increase flexibility of the base stations, it is desirable to allow the antennas to be located remote from the baseband unit. This has lead to the development of active antenna systems which are also termed remote antenna heads. Typically, one remote antenna head contains one sector antenna, but there are also systems known, which have remote antenna heads with more than only one sector antenna.

The base stations are preferably connected with the remote antenna heads by means of optical fibers. Conventional radio-over-fiber scenarios involve optical transmission of analogue signals between a base station and a transmitter with an amplifier in a remote antenna head.

An example for the implementation of a radio-over-fiber concept in a cellular radio network using a two-fiber-ring is given in the European patent EP 1553791 B1.

However, the quality of the optical transmission suffers severely from noise, non-linearities, like e.g. chromatic dispersion, and attenuation effects. Consequently the technical implementations for radio-over-fiber concepts must involve highly sophisticated optical modulation techniques and signal conditioning.

Basically, the optical transmission of analogue radio frequency signals involves high electronic efforts for signal modulation techniques and signal conditioning. Indeed, e.g. the method of intensity modulation and direct detection is straightforward, simple and allows for fairly linear optical transmission properties, but on the other hand it requires costly modulators and modulator drivers in order to meet the requirements for analogue radio frequency transmission. In case double side band modulation is used, chromatic dispersion will result in frequency and length dependent suppression of radio frequency power, which will deteriorate the transmission quality.

The object of the invention is thus to propose a cost-effective and fault-tolerant method for transmission of signals from a transmitting device to at least one receiving device using an energy efficient power amplifier architecture for signal amplification with an optical connection between the transmitting device and the at least one receiving device.

This object is achieved by a method according to the teaching of claim 1, an envelope elimination and restoration amplifier according to the teaching of claim 8, a transmitting device according to the teaching of claim 10, a receiving device according to the teaching of claim 13, and a communication network according to the teaching of claim 15.

As mobile communication systems like e.g. Universal Mobile Telecommunications System (UMTS), Worldwide Interoperability for Microwave Access (WIMAX), or Third Generation Partnership Project Long Term Evolution (3GPP LTE) require power amplifiers with high output power at frequencies up to 2.6 GHz, preferably so-called envelope elimination and restoration amplifiers are used for signal amplification, as they feature a high degree of linearity and efficiency.

In said envelope elimination and restoration amplifiers, the data signal is represented by an envelope signal component of relatively slowly varying amplitude, and a faster varying phase signal component of constant amplitude. The fast phase signal controls the input of e.g. a class E or F output stage whereas the envelope signal drives a modulator which again controls the supply voltage of said output stage. The envelope signal components or the phase signal components can be digital signals used for amplification e.g. in switched output stages.

In the US patent application US 2002/0141510 A1, a modulator and a method of modulating is disclosed which utilizes phase or frequency modulation and amplitude modulation. A delay circuit or synchronization circuit is utilized to coordinate the performance of amplitude modulation and phase modulation. The modulation circuit can be utilized in any frequency range including high frequency and low frequency circuits.

The main idea of the invention is to exploit the existence of a digital signal path inside the existing envelope elimination and restoration amplifier concept for optical transmission of data signals by dividing the envelope elimination and restoration amplifier into two remote parts connected by at least one optical connection, as digital signals are more fault-tolerant against interferences than analogue signals.

The invention enables transmission of digital instead of analogue signals by drawing use from a digital signal path which is already existing inside envelope elimination and restoration amplifiers. As a digital signal which is already available within the envelope elimination and restoration amplifiers is used, there is no need for additional costly high speed analogue-to-digital and digital-to-analogue conversion. Thus, compared with conventional radio-over-fiber scenarios, at zero additional costs all the concepts for optical transmission of digital signals can be applied to radio-over-fiber applications.

An envelope elimination and restoration amplifier for signal amplification is used for transmission of signals from a base station via at least one remote antenna head to a user terminal, and the signals are transmitted over at least one optical connection from the base station to the at least one remote antenna head. The invention allows for realization of superior radio-over-fiber architecture by dividing the existing envelope elimination and restoration amplifier described above into two parts separated by digital optical links and placing them in a central base station and close to a remote antenna unit respectively. This concept enables new architectures which easily reduce costs and hardware effort, e.g. in beamforming and multiple input multiple output (MIMO) applications.

According to the invention, data signals are represented by envelope signal components and phase signal components in a first part of the envelope elimination and restoration amplifier located in a transmitting device, at least one of the group of envelope signal components and phase signal components are converted from electrical signals into optical signals in at least one electro-optical converter located in the transmitting device, the at least one of the group of envelope signal components and phase signal components are transmitted over at least one optical connection from the transmitting device to the at least one receiving device, the at least one of the group of envelope signal components and phase signal components are converted from optical signals into electrical signals in at least one opto-electrical converter located in said at least one receiving device, and said data signals are amplified by an output stage in a second part of the envelope elimination and restoration amplifier that is located in said at least one receiving device.

Further developments of the invention can be gathered from the dependent claims and the following description.

In the following the invention will be explained further making reference to the attached drawings.

FIG. 1 schematically shows a cellular communication network with a base station and remote antenna heads in which the invention can be implemented.

Figure 2:
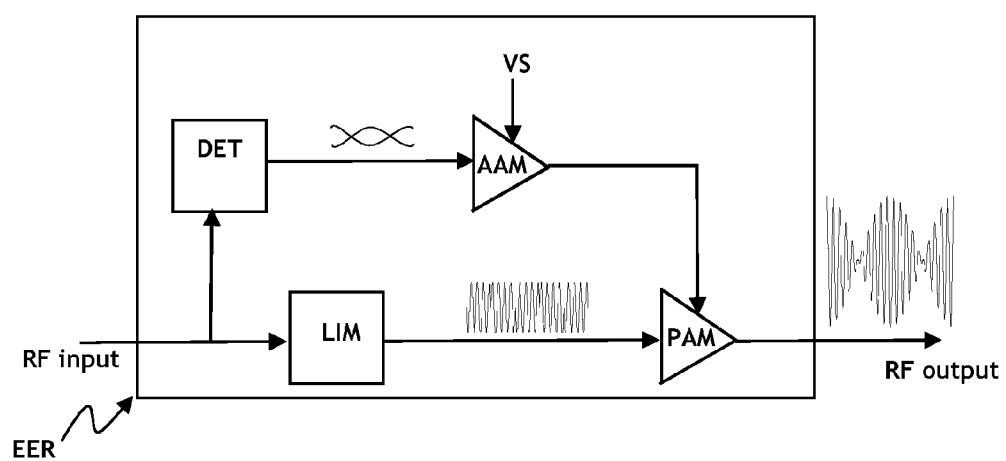

FIG. 2 schematically shows an envelope elimination and restoration amplifier architecture according to the state-of-the-art.

Figure 3:
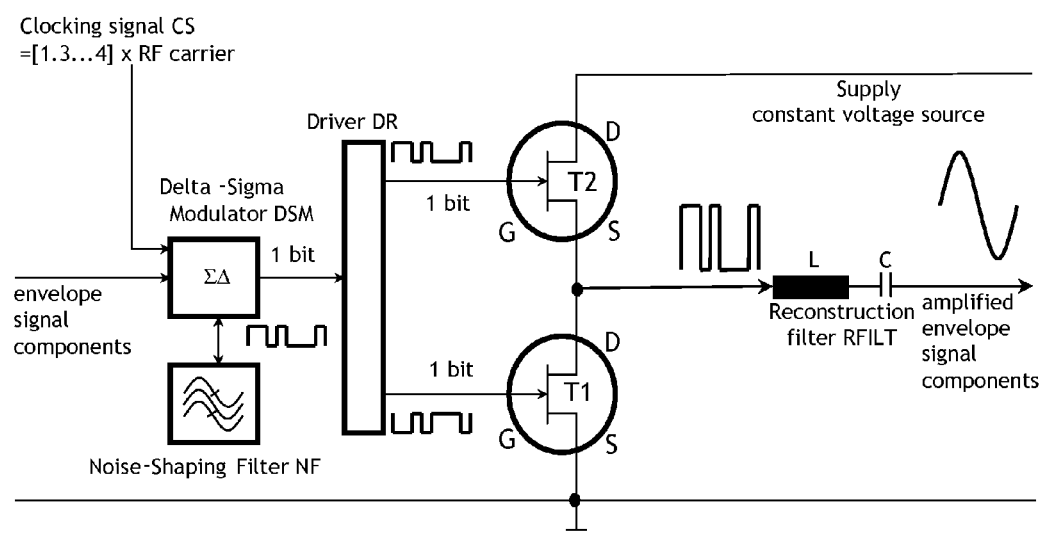

FIG. 3 schematically shows a switched mode power amplifier architecture relying on a voltage switched circuit topology according to the state-of-the-art.

Figure 4:
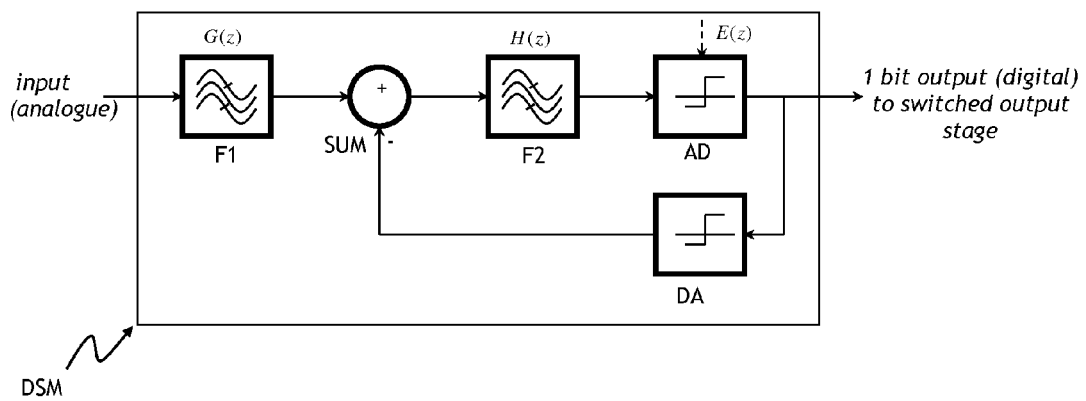

FIG. 4 schematically shows a delta sigma modulator according to the state-of-the-art.

Figure 5:
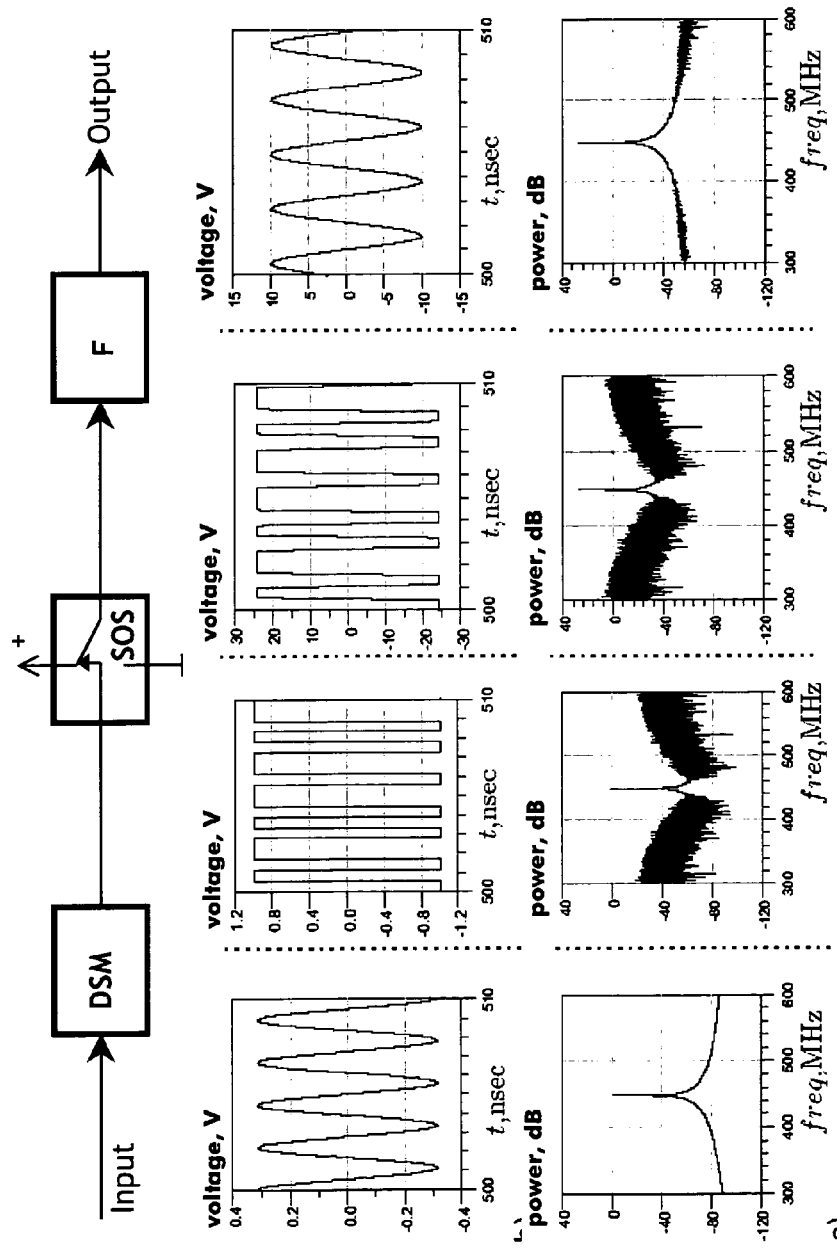

FIG. 5 schematically shows a switched mode power amplifier with a delta sigma modulator, a switched output stage and a filter according to the state-of-the-art.

Figure 6:
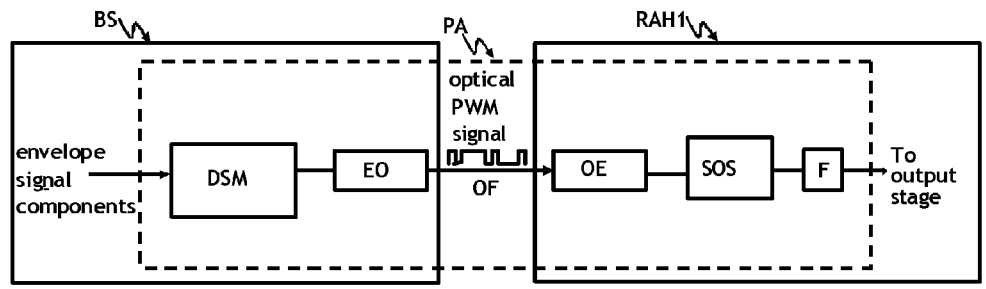

FIG. 6 schematically shows a switched mode power amplifier that is divided into two parts located in a base station and in a remote antenna head respectively according to the invention.

Figure 7:
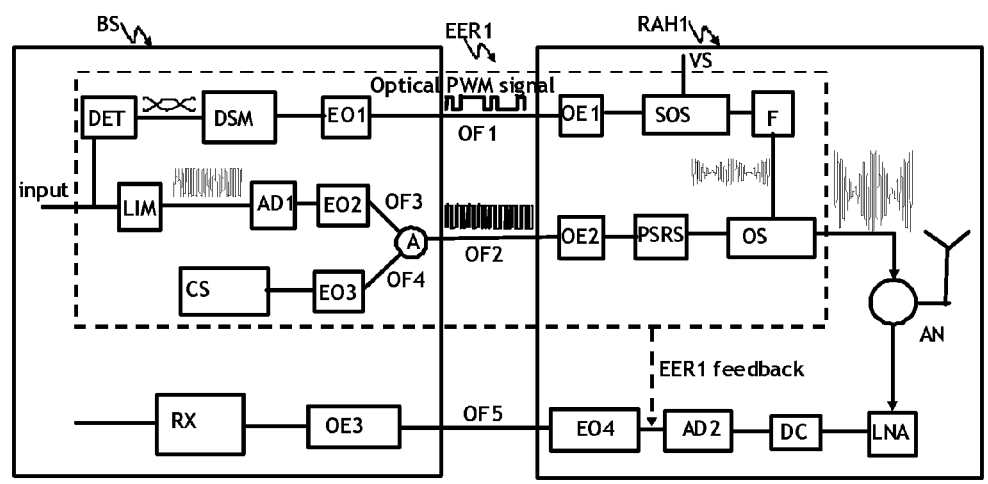

FIG. 7 schematically shows a transmitter and a receiver comprising a distributed envelope elimination and restoration amplifier according to the invention.

Figure 8:
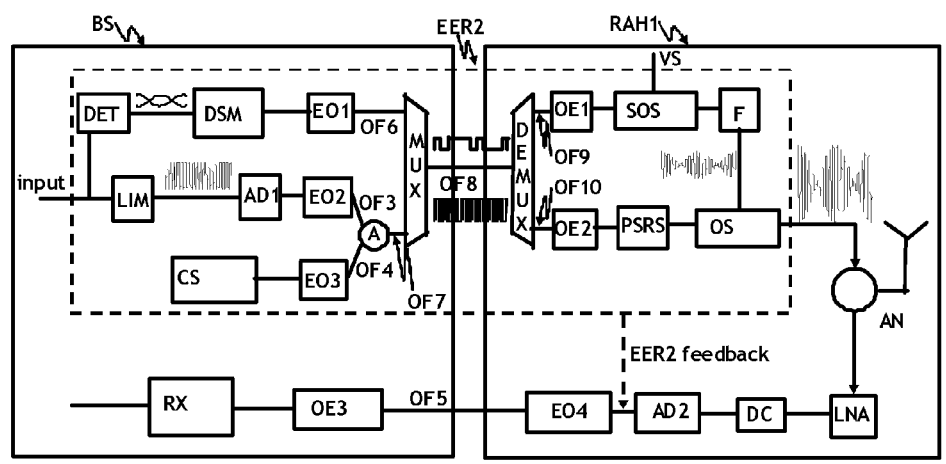

FIG. 8 schematically shows a transmitter and a receiver comprising a distributed envelope elimination and restoration amplifier interconnected by a single optical path applying the principles of optical multiplexing and demultiplexing according to the invention.

The principle structure of a communication network CN for signal transmission and reception in which the invention can be implemented is shown in FIG. 1. The communication network CN comprises a base station BS, remote antenna heads RAH1-RAH4 and user terminals UE1-UE4.

Each of said remote antenna heads RAH1-RAH4 is connected to the base station BS by means of an optical connection, as e.g. an optical fiber or an optical free-space connection, OF1, OF2, OF11, OF12 and OF13 respectively. Each of said user terminals UE1-UE4 is connected to one or multiple of said remote antenna heads RAH1-RAH4, which is symbolized by double arrows in FIG. 1. The base station BS is in turn connected to a core network, which is not shown in FIG. 1 for the sake of simplicity.

For amplification of signals that shall be transmitted from the base station BS via a remote antenna head RAH1-RAH4 to a user terminal UE1-UE4, preferably envelope elimination and restoration amplifiers are used that are preferably located in the remote antenna heads RAH1-RAH4 according to the state-of-the-art.

FIG. 2 schematically shows an envelope elimination and restoration amplifier according to the state-of-the-art.

An input for radio frequency (RF) signals of the envelope elimination and restoration amplifier is connected both to an input of an amplitude detector DET and to an input of a limiter LIM.

An output of the amplitude detector DET is connected to a first input of an amplitude amplifier AAM. A second input of the amplitude amplifier AAM is provided to connect a supply voltage VS.

An output of the limiter LIM is connected to a first input of a phase amplifier PAM, and an output of the amplitude amplifier AAM is connected to a second input, the supply voltage input, of the phase amplifier PAM.

An output of the phase amplifier PAM is provided to output an amplified phase and amplitude modulated signal.

In a method for signal amplification using an envelope elimination and restoration amplifier according to the state-of-the-art as shown in FIG. 2, an analogue radio frequency input signal is sent to the input of the envelope elimination and restoration amplifier. An envelope signal component of the input signal is sensed using e.g. a coupler and the amplitude detector DET, and the envelope signal component is provided to the amplitude amplifier AAM.

The main amplitude and phase modulated radio frequency input signal is sent to the input of the limiter LIM, in which a complex input signal $A(t)e^{i(\omega t+\phi(t))}$, with $A(t)$ being the time-dependent amplitude, $\omega$ being the carrier frequency and $\phi(t)$ being the time-dependent phase, is clipped resulting in a phase signal component of constant amplitude $e^{i(\omega t+\phi(t))}$.

The envelope signal component is sensed by the amplitude detector DET sensing the signal before the limiter LIM. By the amplitude detector DET, the varying phase signal is eliminated resulting in an envelope signal component of slowly varying amplitude $A(t)$.

The envelope signal component of slowly varying amplitude is sent to the first input of the amplitude amplifier AAM. The supply voltage VS, which is connected to the second input of the amplitude amplifier AAM, is modulated with the envelope signal component of slowly varying amplitude resulting in an amplified envelope signal component.

The phase signal component of constant amplitude is sent to the first input, i.e. the radio frequency input, of the phase amplifier PAM, and the amplified envelope signal component is connected as supply voltage to the second input, i.e. the supply voltage input, of the phase amplifier PAM, which results in an amplified copy of the analogue radio frequency input signal at the output of the phase amplifier PAM.

According to the invention, the existence of a digital signal path inside an envelope elimination and restoration amplifier is used for optical transmission of signals. Such a digital signal path can be implemented in an envelope elimination and restoration amplifier as shown in FIG. 2 e.g. by a delta sigma modulator and a subsequent switched output stage in the path of the envelope signal component of slowly varying amplitude.

To perform this implementation of a digital signal path, the output of the amplitude detector DET is connected to the input of a delta sigma modulator, and the output of the delta sigma modulator is connected to the input of the amplitude amplifier AAM, which is a switched output stage, as e.g. a class D amplifier in this case.

In the following, the basic principle of a switched mode amplifier using a delta sigma modulator is described, and subsequently the application of a switched mode amplifier with a delta sigma modulator in two embodiments of the invention is depicted.

As an example for a switched mode power amplifier, a voltage switched power amplifier system according to the state-of-the-art is shown in FIG. 3. Such a voltage switched power amplifier system comprises a delta sigma modulator DSM with inputs for reception of an analogue radio frequency input signal, or an envelope signal component according to the invention, and for reception of a clocking signal CS. An output of the delta sigma modulator DSM is connected to an input of a driver DR.

Preferably, the delta sigma modulator DSM is connected to a noise-shaping filter NF or comprises a noise shaping filter.

A first output of the driver DR is connected to the gate G of a first transistor T1, and a second output of the driver DR is connected to the gate G of a second transistor T2.

The source S of the first transistor T1 is connected to ground, and the source of the second transistor T2 is connected to the drain of the first transistor T1.

The drain of the first transistor T1 and the source of the second transistor T2 are connected to an output for radio frequency signals, or amplified analogue envelope signal components according to the invention, via a reconstruction filter RFILT that comprises an inductor L and a capacitor C in series. There are variants of the L-C filter topology which however are of no importance for the invention as disclosed.

The drain of the second transistor T2 is connected to the supply of a constant voltage source.

In a method for signal amplification using a voltage switched power amplifier system according to the state-of-the-art as shown in FIG. 3, analogue radio frequency input signals, or envelope signal components according to the invention, are sent to the delta sigma modulator DSM. Furthermore, clocking signals with a multiple of the radio frequency carrier frequency are sent to the delta sigma modulator DSM.

In the delta sigma modulator DSM, the analogue radio frequency input signals, or envelope signal components, are converted into digital 1-bit or higher resolution signals. The sampling rate is determined by the received clocking signals. The digital 1-bit signals are provided at the output of the delta sigma modulator DSM.

Preferably, the noise shaping filter NF is used to minimize quantization error by means of shifting quantization noise into frequency ranges that are less or not relevant for signal processing.

Said digital 1-bit signals are sent to the driver DR that generates first driver signals based on the digital 1-bit signals and second driver signals based on the inverted digital 1-bit signals. The first driver signals are sent to the gate of the second transistor T2, and the second driver signals are sent to the gate of the first transistor T1. The output signals of the driver DR are thus in antiphase which means if the first transistor T1 is on, the second transistor T2 is off and vice versa. The described amplifier architecture with two transistors T1, T2 is just an example, and in alternative architectures, only one, as e.g. in Class J amplifiers, or more than two transistors are used, which has however no influence on the invention. In the latter case, such alternative architectures are e.g. multibit architectures, using two transistors more per each bit more.

The capacitor C and the inductor L together build a reconstruction filter RFILT used to generate smooth analogue output signals that are provided at the output for radio frequency signals, or amplified analogue envelope signal components.

FIG. 4 is illustrating a delta sigma modulator DSM according to the state-of-the-art. The delta sigma modulator DSM comprises a filter F1, a summer SUM, a noise shaping filter F2, an analog-to-digital converter AD and a digital-to-analog converter DA.

The filter F1 has an input for receiving analogue input signals. The output of the filter F1 is connected to a first input of the summer SUM.

The output of the summer SUM is connected to the input of the noise shaping filter F2, and the output of the noise shaping filter F2 is connected to the input of the analog-to-digital converter AD.

The output of the analog-to-digital converter AD is on the one hand connected to the input of the digital-to-analog converter DA, and can on the other hand be connected to an external device, as e.g. the driver D of the switched output stage in FIG. 3, for transmitting digital output signals.

The output of the digital-to-analog converter DA is connected to a second inverting input of the summer SUM.

In principle, an analogue radio frequency input signal, or envelope signal component, is encoded in the delta sigma modulator DSM into a two level digital output sequence that is appropriate for driving a switched output stage of a switched mode amplifier.

FIG. 5 is illustrating in the upper row schematically a switched mode power amplifier according to the state of the art that comprises a delta sigma modulator DSM as depicted in FIG. 4, a switched output stage SOS, and a filter F. The switched output stage SOS comprises e.g. the driver DR and the two transistors T1 and T2 as depicted in FIG. 3. However, as the described amplifier architecture with one driver DR and two transistors T1, T2 in FIG. 3 is just an example, in alternative architectures, only one transistor or more than two transistors with more than one driver are used, i.e. the switched output stage SOS can comprise an arbitrary number of drivers and transistors, which has however no influence on the invention.

The delta sigma modulator DSM has an input for receiving input signals. The output of the delta sigma modulator DSM is connected to the input of the switched output stage SOS.

The output of the switched output stage SOS is connected to the input of the filter F, and the filter F comprises an output for transmitting output signals.

In the middle row, 4 diagrams are showing the signal voltage in volts versus time in nanoseconds from left to right for signals at the input of the delta sigma modulator DSM, at the output of the delta sigma modulator DSM, at the output of the switched output stage SOS, and at the output of the filter F.

In the lower row, 4 diagrams are showing the signal power density spectrum in decibels versus frequency in megahertz from left to right for signals at the input of the delta sigma modulator DSM, at the output of the delta sigma modulator DSM, at the output of the switched output stage SOS, and at the output of the filter F.

As can be seen from the first two diagrams in the middle row, the digital signal modulator converts analogue signals into digital signals, and according to the invention, said digital signals will be transmitted over an optical fiber to the switched output stage SOS that is remotely located in a remote antenna head.

The functionality of the switched mode power amplifier depicted in FIG. 5 is described above using radio frequency signals at the input. In the following, the invention will be described for input signals with lower frequencies of e.g. an intermediate or baseband frequency. However, the used frequency at the input has no major influence on the invention. In case of applying the described class S principle to the optically controlled envelope elimination and restoration amplifier concept according to the invention, the delta sigma modulator DSM and the filter F for reconstruction are preferably of low pass type.

A switched mode power amplifier PA that can be used in an envelope elimination and restoration amplifier according to the invention is depicted in FIG. 6. The switched mode power amplifier PA is indicated as a dashed box and comprises a delta sigma modulator DSM, an electro-optical converter EO, an opto-electrical converter OE, a switched output stage SOS and a filter F. The switched output stage in turn comprises at least one driver and at least one transistor as described above under FIG. 5.

The delta sigma modulator DSM has an input for receiving analogue input signals. An output of the delta sigma modulator DSM is connected to an input of the electro-optical converter EO.

An output of the electro-optical converter EO is connected to an input of the opto-electrical converter OE through an optical connection OF1, as e.g. an optical fiber or an optical free-space connection.

An output of the opto-electrical converter OE is connected to an input of the switched output stage SOS, and an output of the switched output stage SOS is connected to an input of the filter F.

In an embodiment of the invention, a further device for signal conditioning, as e.g. a filter, an equalizer or a preamplifier, is comprised in the signal path between the electro-optical converter EO and the opto-electrical converter OE, or in the signal path between the opto-electrical converter OE and the switched output stage SOS.

An output of the filter F in turn is connected to an antenna network via a further output stage, which is not depicted in FIG. 6 for the sake of simplicity.

In the embodiment depicted in FIG. 6, the delta sigma modulator DSM and the electro-optical converter EO are comprised in a base station BS, which is indicated as a box, and the opto-electrical converter OE, the switched output stage SOS and the filter F are comprised in a remote antenna head RAH1, which is also indicated as a box.

For implementation of the class S principle into the optically controlled envelope elimination and restoration amplifier, in the delta sigma modulator DSM, analogue signals, as e.g. analogue envelope signal components, that the delta sigma modulator DSM receives at its input are converted into digital signals. Said digital signals are sent to the electro-optical converter EO for converting the digital electrical signals into digital optical signals. Preferably, said electro-optical converter EO comprises a laser diode which is either directly modulated or externally modulated e.g. by means of an electro-absorption or lithiumniobate modulator.

From the output of the electro-optical converter EO, the digital optical signals, as e.g. PWM signals (PWM=Pulse Width Modulation), are sent over the optical connection OF1, as e.g. an optical fiber or an optical free-space connection, to an input of the opto-electrical converter OE.

In the opto-electrical converter OE, the digital optical signals are back-converted into digital electrical signals. Preferably, said opto-electrical converter OE comprises a so-called PIN-diode or a so-called avalanche-photo-diode. The digital electrical signals are sent from an output of the opto-electrical converter OE to an input of the switched output stage SOS.

In the switched output stage SOS, the digital electrical signals drive at least one transistor via at least one driver, which leads to amplified digital electrical signals at the output of the switched output stage SOS.

Said amplified digital electrical signals are sent to the input of the filter F, and by means of said filter F, the amplified analogue envelope signal components are reconstructed and sent via the output of the filter F to an input of a further output stage as e.g. the second input of the phase amplifier PAM as shown in FIG. 2.

An embodiment of an envelope elimination and restoration amplifier EER1 according to the invention which applies the principle of optical heterodyning is depicted in FIG. 7. The envelope elimination and restoration amplifier EER1 is indicated as a dashed box and comprises an amplitude detector DET, a delta sigma modulator DSM, a limiter LIM, a first analogue-to-digital converter AD1, a carrier synthesizer CS, three electro-optical converters EO1, EO2, and EO3, an optical adder A, two opto-electrical converters OE1 and OE2, a phase signal re-synthesizer PSRS, a switched output stage SOS, an output stage OS and a filter F. The switched output stage SOS in turn comprises at least one driver and at least one transistor as described above under FIG. 5.

In the embodiment depicted in FIG. 7, the amplitude detector DET, the delta sigma modulator DSM, the limiter LIM, the first analogue-to-digital converter AD1, the carrier synthesizer CS, the three electro-optical converters EO1, EO2, and EO3, and the optical adder A are comprised in a base station BS, which is indicated as a box, and the two opto-electrical converters OE1 and OE2, the phase signal re-synthesizer PSRS, the switched output stage SOS, the output stage OS and the filter F are comprised in a remote antenna head RAH1, which is also indicated as a box.

The base station BS further comprises a feedback path with a third opto-electrical converter OE3 and a receiver RX.

The remote antenna head RAH1 further comprises an antenna network AN, a low noise amplifier LNA, a down converter DC, a second analogue to digital converter AD2 and a fourth electro-optical converter EO4.

An input for e.g. baseband frequency or intermediate frequency (IF) signals of the envelope elimination and restoration amplifier EER1 is connected both to an input of the amplitude detector DET and to an input of the limiter LIM.

An output of the amplitude detector DET is connected to an input of the delta sigma modulator DSM, and an output of the delta sigma modulator DSM is connected to an input of the first electro-optical converter EO1.

An output of the first electro-optical converter EO1 is connected to an input of the first opto-electrical converter OE1 through an optical connection OF1, as e.g. an optical fiber or an optical free-space connection, and an output of the first opto-electrical converter OE1 is connected to a first input of the switched output stage SOS.

A second input of the switched output stage SOS is provided to connect a supply voltage VS, and an output of the switched output stage SOS is connected to an input of the filter F.

An output of the limiter LIM is connected to an input of the first analogue-to-digital converter AD1, and an output of the first analogue-to-digital converter AD1 is connected to an input of the second electro-optical converter EO2.

An output of the second electro-optical converter EO2 is connected to a first input of the optical adder A through an optical connection OF3.

An output of the carrier synthesizer CS is connected to an input of the third electro-optical converter EO3, and an output of the third electro-optical converter EO3 is connected to a second input of the optical adder A through an optical connection OF4.

The output of the optical adder A is connected to an input of the second opto-electrical converter OE2 through an optical connection OF2, as e.g. an optical fiber or an optical free-space connection.

An output of the second opto-electrical converter OE2 is connected to an input of the phase signal re-synthesizer PSRS, and an output of the phase signal re-synthesizer PSRS is connected to a first input of the output stage OS.

An output of the filter F is connected to a second input of the output stage OS, and an output of the output stage OS is in turn connected to the antenna network AN.

In an embodiment of the invention, a further device for signal conditioning, as e.g. an equalizer or a pre-amplifier, is comprised in the signal paths between the electro-optical converters EO1, EO2 and EO3 and the opto-electrical converters OE1 and OE2 respectively, or in the signal paths between the opto-electrical converters OE1 and OE2 and the switched output stage SOS and the output stage OS respectively.

In a reception path, an output of the antenna network AN is connected to an input of the low noise amplifier LNA, and an output of the low noise amplifier LNA is connected to an input of the down converter DC.

An output of the down converter DC is connected to an input of the second analogue-to-digital converter AD2, and an output of the second analogue-to-digital converter AD2 is connected to an input of the fourth electro-optical converter EO4.

An output of the fourth electro-optical converter EO4 is connected to an input of the third opto-electrical converter OE3 through an optical connection OF5 as e.g. an optical fiber or an optical free-space connection.

The output of the third opto-electrical converter OE3 is in turn connected to an input of the receiver RX.

In an embodiment of the invention, an output of the envelope elimination and restoration amplifier EER1 is connected to the reception path, preferably at an input of the fourth electro-optical converter EO4, which is indicated by a dotted arrow in FIG. 7.

Preferably, said electro-optical converters EO1-EO4 each comprise a laser diode which is either directly modulated or externally modulated e.g. by means of a electroabsorption or lithiumniobate modulator.

Preferably, said opto-electrical converters OE1-OE3 each comprise a so-called PIN-diode or a so-called avalanche-photo-diode.

In the embodiment depicted in FIG. 7, an analogue data signal, e.g. on a baseband frequency $f_{bb}$, preferably in the frequency range 0-200 MHz is sent to the input of the envelope elimination and restoration amplifier EER1.

A main part of the data signal is sent to the input of the limiter LIM, in which the data signal $A(t)\exp(i(\omega_{bb}t+\phi(t)))$, with $A(t)$ being the time-dependent amplitude, $\omega_{bb}$ being the baseband angular frequency and $\phi(t)$ being the time-dependent phase, is clipped resulting in a phase signal component of constant amplitude $\exp(i(\omega_{bb}t+\phi(t)))$.

An envelope signal component of the data signal is sensed by the amplitude detector DET sensing the signal before the limiter LIM. The varying phase signal is eliminated by the amplitude detector DET resulting in an envelope signal component of slowly varying amplitude $A(t)$.

The envelope signal component of slowly varying amplitude is sent to the first input of the delta sigma modulator DSM, and is converted into a digital signal in the delta sigma modulator DSM. In this embodiment, the digital signal is a PWM signal (PWM=Pulse Width Modulation), but could also be encoded additionally using e.g. Manchester Coding in another embodiment. The delta sigma modulation used for digitizing the envelope signal component can be performed by means of a conventional, relatively slow low-pass delta sigma modulator, thus saving energy and chip complexity.

The digital envelope signal component is sent to the first electro-optical converter EO1 for converting digital electrical signals into digital optical signals.

From the output of the first electro-optical converter EO1, the digital optical envelope signal component, which is a PWM signal in this embodiment, is sent over the optical connection OF1 to the input of the first opto-electrical converter OE1.

In the first opto-electrical converter OE1, digital optical signals are back-converted into digital electrical signals. The resulting digital electrical envelope signal component is sent from the output of the first opto-electrical converter OE1 to the first input of the switched output stage SOS.

In the switched output stage SOS, the digital electrical signals drive at least one transistor via at least one driver, which leads to amplified digital electrical signals at the output of the switched output stage SOS. Thus, the supply voltage VS, which is connected to the second input of the switched output stage SOS, is modulated with the digital electrical envelope signal component resulting in an amplified digital electrical envelope signal component.

Said amplified digital electrical envelope signal component is sent to the input of the filter F, and by means of said filter F, the amplified analogue envelope signal component is reconstructed and is connected as supply voltage to the second input of the output stage OS via the output of the filter F.

The phase signal component is sent from the output of the limiter LIM to the input of the first analogue-to-digital converter AD1, in which the analogue phase signal component is converted to a digital phase signal component.

The digital phase signal component is sent to the input of the second electro-optical converter EO2 for converting digital electrical signals into digital optical signals using an optical source with $f_{optical}$ being the frequency of the light of the optical source, so that the digital optical phase signal component has a frequency $f_{os}=f_{optical} \pm f_{bb}$.

From the output of the second electro-optical converter EO2, the digital optical phase signal component is sent over the optical connection OF3 to the first input of the optical adder A.

In the carrier synthesizer CS, a radio frequency carrier signal on a radio frequency $f_{rf}$ preferably in the frequency range of several hundreds of MHz to several GHz is generated. The radio frequency carrier signal is sent to the third electro-optical converter EO3 for converting the electrical radio frequency carrier signal into an optical radio frequency carrier signal using an optical source with $f_{optical}$ being the frequency of the light of the optical source, so that the optical radio frequency carrier signal has a frequency $f_{orf}=f_{optical} \pm f_{rf}$.

From the output of the third electro-optical converter EO3, the optical radio frequency carrier signal is sent over the optical connection OF4 to the second input of the optical adder A.

In the optical adder A, the digital optical phase signal component is added with the optical radio frequency carrier signal, i.e. the digital optical phase signal component with the frequency $f_{os}=f_{optical} \pm f_{bb}$ is summed up with the optical radio frequency carrier signal with the frequency $f_{orf}=f_{optical} \pm f_{rf}$ which results in combined optical data signals.

From the output of the optical adder A, the combined optical data signals are sent over the optical connection OF2 to an input of the second opto-electrical converter OE2.

In the second opto-electrical converter OE2, the principle of optical heterodyning is applied, and the digital optical phase signal component is upconverted into a digital electrical phase signal component. The intensity of the detected digital electrical phase signal component varies with a frequency $f_{des}=f_{rf} \pm f_{bb}$, as all higher frequency components of the intensity in the range of $f_{optical}$ are time averaged in the second opto-electrical converter OE2. The digital electrical phase signal component is sent from an output of the second opto-electrical converter OE2 to an input of the phase signal re-synthesizer PSRS in which the analogue electrical phase signal component is recovered.

The analogue electrical phase signal component is sent from the output of the phase signal re-synthesizer PSRS to the first input of the output stage OS. The analogue electrical phase signal component controls the first input of the output stage OS, which leads to an amplified copy of the analogue data signal at the output of the output stage OS.

In an embodiment of the invention, the analogue electrical phase signal component is recovered by means of implicit passive signal reconstruction filtering in the output stage OS, and no phase signal re-synthesizer PSRS is needed.

The amplified copy of the analogue data signal is sent to the antenna network AN for transmission over an air interface.

In the reception path, analogue electrical signals are sent from the antenna network AN to the low noise amplifier LNA for signal amplification.

The amplified analogue electrical signals are sent to the down converter DC in which the signals are downconverted from the radio frequency to the baseband frequency.

The downconverted analogue electrical signals are sent to the second analogue-to-digital converter AD2 for digitalization, and the digital electrical signals are sent to the fourth electro-optical converter EO4 for converting the digital electrical signals into digital optical signals.

The digital optical signals are sent from the fourth electro-optical converter EO4 to the third opto-electrical converter OE3 through the optical connection OF5.

In the third opto-electrical converter OE3, the digital optical signals are back-converted into digital electrical signals and sent to the receiver RX for further processing.

In an embodiment of the invention, if linearization of the envelope elimination and restoration amplifier EER1 should become necessary, a certain fraction of the output signal of the envelope elimination and restoration amplifier EER1 is fed back via the fourth electro-optical converter EO4 and the optical connection OF5 to the base station BS, and based on said fed back output signal, the envelope elimination and restoration amplifier EER1 is controlled.

Advantages of the above described embodiment of the invention are, that by using optical heterodyning, the need for electrical upconversion is dropped, and the phase signal related signal processing is performed on a baseband frequency level at considerably reduced speed and hence reduced power dissipation and chip complexity.

However, the application of optical heterodyning is not mandatory for the invention. Thus, in an embodiment of the invention, the phase signal component is electrically upconverted after reception in the second opto-electrical converter OE2. In yet another embodiment of the invention, the phase signal component is electrically upconverted before it is sent to the second electro-optical converter EO2, and the digital optical phase signal component is sent directly over an optical connection to the second opto-electrical converter OE2. As a consequence, the carrier synthesizer CS, the third electro-optical converter EO3, and the optical adder A are not necessary in these embodiments.

In principle, it is not necessary for the application of the invention that both the digital phase signal component and the digital envelope signal component are transmitted as an optical signal from the base station BS to the remote antenna head RAH1, i.e. it is possible that either the digital phase signal component or the digital envelope signal component is transmitted electrically from the base station BS to the remote antenna head RAH1. Thus, in embodiments of the invention, either only the digital phase signal component or only the digital envelope signal component is transmitted optically from the base station BS to the remote antenna head RAH1.

In an embodiment of the invention, the analogue data signal which is sent to the input of the envelope elimination and restoration amplifier EER1 is not on a baseband frequency, but on an intermediate frequency.

In the embodiment depicted in FIG. 8, a distributed envelope elimination and restoration amplifier EER2 applying the principles of optical multiplexing and demultiplexing according to the invention is shown. The basic structure of the envelope elimination and restoration amplifier EER2 is similar to the structure of the distributed envelope elimination and restoration amplifier EER1 depicted in FIG. 7 and described above. Thus, in the following only the differences compared to the distributed envelope elimination and restoration amplifier EER1 depicted in FIG. 7 are described.

The envelope elimination and restoration amplifier EER2 in FIG. 8 comprises an optical multiplexer MUX which is located in the base station BS and an optical demultiplexer DEMUX which is located in the remote antenna head RAH1.

The output of the first electro-optical converter EO1 is connected to a first input of the optical multiplexer MUX through an optical connection OF6.

The output of the optical adder A is connected to a second input of the optical multiplexer MUX through an optical connection OF7, and an output of the optical multiplexer MUX is connected to an input of the optical demultiplexer DEMUX through an optical connection OF8.

A first output of the optical demultiplexer DEMUX is connected through an optical connection OF9 to the input of the first opto-electrical converter OE1, and a second output of the optical demultiplexer DEMUX is connected through an optical connection OF10 to the input of the second opto-electrical converter OE2.

In the embodiment depicted in FIG. 7, the digital optical envelope signal component and the digital optical phase signal component are transmitted over separate optical connections OF1 and OF2 from the base station BS to the remote antenna head RAH1.

In the embodiment depicted in FIG. 8, the digital optical envelope signal component, the digital optical phase signal component, and the optical radio frequency carrier signal are multiplexed in the optical multiplexer MUX, and transmitted over the common optical connection OF8 to the optical demultiplexer DEMUX, in which the optical signals are demultiplexed. The digital optical envelope signal component is sent through the optical connection OF9 to the first opto-electrical converter OE1, and the digital optical phase signal component and the optical radio frequency carrier signal are sent through the optical connection OF10 to the second opto-electrical converter OE2.

In a further embodiment of the invention, signals from the base station BS are transmitted through at least two optical connections OF12, OF13 via at least two remote antenna heads RAH3, RAH4 to a user terminal UE4 applying so-called beamforming or multiple-input-multiple-output, as depicted in FIG. 1 for the case of two remote antenna heads RAH3 and RAH4 that are used for signal transmission to the user terminal UE4.

Such an envelope elimination and restoration amplifier according to the invention can be used e.g. for a communication network applying the standard Universal Mobile Telecommunications System, Third Generation Partnership Project Long Term Evolution, or Worldwide Interoperability for Microwave Access.

In the embodiments described above, analogue data signals are provided at the input of the envelope elimination and restoration amplifier EER1 and EER2 respectively. However, in further preferred embodiments, the input data signal provided at the input of the envelope elimination and restoration amplifier EER1 and EER2 respectively is a digital signal, as e.g. a so-called I or Q value provided from a digital processing unit on a baseband frequency. The envelope signal component is sensed from the digital signal and provided as a digital envelope signal component at the input of the delta sigma modulator DSM.

In embodiments using digital input data signals, the delta sigma modulator DSM is preferably implemented in a field programmable gate array (FPGA), but could also be implemented in an application-specific integrated circuit (ASIC). The envelope signal component is preferably directly sensed in the FPGA, i.e. the function of the amplitude detector DET is performed in the FPGA. Clipping of a part of the digital input data signal is preferably also performed in the FPGA resulting in a phase signal component of constant amplitude, i.e. the function of the limiter LIM is performed in the FPGA. In such embodiments, no analog-to-digital converter AD1 is necessary.

In the embodiments described above, the opto-electrical converter OE1 and OE2 respectively, and the output stage SOS and OS respectively are depicted as two distinct devices. However, in further embodiments of the invention, the opto-electrical converter OE1 and OE2 respectively, and the output stage SOS and OS respectively can also be colocated, i.e. they are two parts of one device. An example for such colocated devices is the vertical integration of an avalanche-photo-diode with a high electron mobility transistor (HEMT). In this example, the opto-electrical converter OE1 and OE2 respectively is realized as an avalanche-photo-diode, and the output stage SOS and OS respectively is realized as a high electron mobility transistor (HEMT).

In the embodiments above, the invention is described for the transmission of signals from a base station BS via at least one remote antenna head RAH1 to a user terminal UE1, however the invention is also applicable for transmission of signals from an arbitrary transmitting device to an arbitrary receiving device, as e.g. used in a point-to-point radio system or used for connection of devices within a rack.

The invention claimed is:

1. A method for transmission of data signals, comprising:
   splitting data signals into electrical signals representing envelope signal components and phase signal components in a first part of an envelope elimination and restoration amplifier of a transmitting device,
   converting the electrical signals representing at least one of the envelope signal components and the phase signal components into optical signals at a corresponding at least one electro-optical converter in the first part of the envelope elimination and restoration amplifier, and
   transmitting the optical signals representing the at least one of the envelope signal components and the phase signal components over at least one optical connection from the first part of the envelope elimination and restoration amplifier to a second part of the envelope elimination and restoration amplifier of at least one receiving device.

2. The method according to claim 1, further comprising:
   modulating the envelope signal components in the first part of the envelope elimination and restoration amplifier using a delta sigma modulator.

3. The method according to claim 1, further comprising:
   converting the electrical signals representing the phase signal components into optical phase signal components at an electro-optical converter in the first part of the envelope elimination and restoration amplifier,
   synthesizing electrical radio frequency (RF) carrier signals and converting the electrical RF carrier signals into optical RF carrier signals at a further electro-optical converter in the first part of the envelope elimination and restoration amplifier,
   combining the optical phase signal components with the optical RF carrier signals to form the corresponding optical signal representing the phase signal components.

4. The method according to claim 1, further comprising:
   receiving an output signal fed back from the second part of the envelope elimination and restoration amplifier at the first part of the envelope elimination and restoration amplifier, and
   controlling at least the first part of the envelope elimination and restoration amplifier based at least in part on said fed back output signal.

5. The method according to claim 1, wherein said transmitting device is within a base station and each at least one receiving device is within a remote antenna head, wherein said data signals are transmitted from the base station via each at least one remote antenna head to a user terminal.

6. The method according to claim 5, wherein data signals from the base station are transmitted via at least two remote antenna heads to the user terminal using beamforming or multiple-input-multiple-output.

7. The method according to claim 1, further comprising:
   converting the electrical signals representing both the envelope signal components and the phase signal components into optical signals at electro-optical converters in the first part of the envelope elimination and restoration amplifier,
   optically multiplexing the optical signals representing the envelope signal components and the optical signals representing the phase signal components at an optical multiplexer in the first part of the envelope elimination and restoration amplifier,
   transmitting the multiplexed optical signals representing the envelope signal components and the phase signal components over the at least one optical connection from the first part of the envelope elimination and restoration amplifier to the
   second part of the envelope elimination and restoration amplifier.

8. A transmitting device for transmission of data signals, comprising:
   a first part of an envelope elimination and restoration amplifier configured to split data signals into envelope signal components and phase signal components, the first part comprising:
      a first signal path for the envelope signal components,
      a second signal path for the phase signal components,
      at least one electro-optical converter configured to convert at least one of the envelope signal components and the phase signal components from electrical signals into optical signals, and
      separate transmission channels for transmission of the envelope signal components and the phase signal components before combination of the envelope signal components and the phase signal components, wherein at least one transmission channel includes an optical connection for transmission of the optical signals.

9. The transmitting device according to claim 8, the first part of the envelope elimination and restoration amplifier further comprising:
   a delta sigma modulator in the first signal path for envelope signal components.

10. The transmitting device according to claim 8, wherein said transmitting device is within a base station for transmission of signals via a remote antenna head to a user terminal.

11. The transmitting device according to claim 8, wherein the transmitting device is used for a communication network applying the standard Universal Mobile Telecommunications System, Third Generation Partnership Project Long Term Evolution, or Worldwide Interoperability for Microwave Access.

12. A receiving device for reception of data signals, comprising:
 a second part of an envelope elimination and restoration amplifier configured to receive data signals from a transmitting device, wherein the data signals were split into envelope signal components and phase signal components and sent via separate transmission channels for the envelope signal components and the phase signal components by the transmitting device, wherein at least one of the envelope signal components and the phase signal components were converted from electrical signals into optical signals by the transmitting device, wherein the optical signals are received from the transmitting device via at least one optical connection, the second part comprising:
  at least one opto-electrical converter configured to convert the at least one of the envelope signal components and phase signal components from optical signals into electrical signals,
  a first output stage configured to amplify the envelope signal components, and
  a second output stage configured to amplify the phase signal components.

13. The receiving device according to claim 12, wherein the first output stage includes a class D switched output stage.

14. The receiving device according to claim 12, wherein said receiving device is within a remote antenna head for reception of signals sent from a base station.

15. A method for transmission of data signals, comprising:
 receiving optical signals representing at least one of envelope signal components and phase signal components of data signals from a first part of an envelope elimination and restoration amplifier of a transmitting device at a second part of the envelope elimination and restoration amplifier of a receiving device via at least one optical connection, the optical signals resulting from a splitting of the data signals into electrical signals representing the at least one of the envelope signal components and the phase signal components by the first part of the envelope elimination and restoration amplifier and a conversion of the electrical signals into the optical signals by the first part of the envelope elimination and restoration amplifier;
 converting the received optical signals to electrical signals representing the at least one of the envelope signal components and the phase signal components at a corresponding at least one opto-electrical converter of the second part of the envelope elimination and restoration amplifier; and
 amplifying the corresponding converted electrical signals at the second part of the envelope elimination and restoration amplifier.

16. The method according to claim 15, further comprising:
 amplifying the electrical signal representing the envelope signal components at a switched output stage of the second part of the envelope elimination and restoration amplifier.

17. The method according to claim 15, wherein at least one received optical signal represents the phase signal components of the data signal in combination with an optical radio frequency (RF) carrier signal;
 wherein the optical RF carrier signal results from a synthesis of an electrical RF carrier signal by the first part of the envelope elimination and restoration amplifier, a conversion of the electrical RF carrier signal into the optical RF carrier signal by the first part of the envelope elimination and restoration amplifier, and a combining of the optical RF carrier signal with the phase signal components of the data signal to form the corresponding received optical signal;
 the method further comprising:
 upconverting the optical phase signal components to an RF domain by multiplication with the optical RF carrier signals applying optical heterodyning in the opto-electrical converter.

18. The method according to claim 15, further comprising:
 feeding back an output signal from the second part of the envelope elimination and restoration amplifier to the transmitting device;
 wherein control of at least the first part of the envelope elimination and restoration amplifier is based at least in part on the fed back output signal.

19. The method according to claim 15, wherein the transmitting device is within a base station and the receiving device is within a remote antenna head, wherein the data signals are transmitted from the base station to a user terminal via the remote antenna head.

20. The method according to claim 15, wherein the envelope signal components and the phase signal components are optically multiplexed by the first part of the envelope elimination and restoration amplifier such that the received optical signals represent both the envelope signal components and the phase signal components of the data signal, the method further comprising:
 optically demultiplexing the envelope signal components and the phase signal components from the received optical signals at an optical demultiplexer of the second part of the envelope elimination and restoration amplifier.

* * * * *